(12) United States Patent
Archer et al.

(10) Patent No.: US 9,208,052 B2
(45) Date of Patent: *Dec. 8, 2015

(54) ALGORITHM SELECTION FOR COLLECTIVE OPERATIONS IN A PARALLEL COMPUTER

(71) Applicant: INTERNATIONAL BUSINESS MACHINES CORPORATION, Armonk, NY (US)

(72) Inventors: Charles J. Archer, Rochester, MN (US); James E. Carey, Rochester, MN (US); Philip J. Sanders, Rochester, MN (US); Brian E. Smith, Knoxville, TN (US)

(73) Assignee: International Business Machines Corporation, Armonk, NY (US)

(*) Notice: Subject to any disclaimer, the term of this patent is extended or adjusted under 35 U.S.C. 154(b) by 316 days.

This patent is subject to a terminal disclaimer.

(21) Appl. No.: 13/798,619

(22) Filed: Mar. 13, 2013

(65) Prior Publication Data

US 2014/0282429 A1 Sep. 18, 2014

Related U.S. Application Data

(63) Continuation of application No. 13/796,994, filed on Mar. 12, 2013.

(51) Int. Cl.
```
G06F 9/44      (2006.01)
G06F 11/34     (2006.01)
G06F 11/07     (2006.01)
G06F 9/54      (2006.01)
```
(52) U.S. Cl.
CPC ............ *G06F 11/3409* (2013.01); *G06F 9/546* (2013.01); *G06F 11/0751* (2013.01)

(58) Field of Classification Search
USPC .......................................... 717/130
See application file for complete search history.

(56) References Cited

U.S. PATENT DOCUMENTS

| | | | |
|---|---|---|---|
| 5,442,785 A * | 8/1995 | Roffe et al. ........................ 1/1 |
| 7,301,905 B1 * | 11/2007 | Tontiruttananon et al. ... 370/232 |
| 2005/0097546 A1 * | 5/2005 | Johnson ...................... 717/177 |
| 2009/0063816 A1 * | 3/2009 | Arimilli et al. ................. 712/30 |
| 2011/0258627 A1 * | 10/2011 | Faraj et al. ..................... 718/100 |
| 2011/0270986 A1 * | 11/2011 | Archer et al. ................. 709/226 |

* cited by examiner

*Primary Examiner* — Li B Zhen
*Assistant Examiner* — Sen Chen
(74) *Attorney, Agent, or Firm* — Edward J. Lenart; Grant A. Johnson; Kennedy Lenart Spraggins LLP

(57) ABSTRACT

Algorithm selection for collective operations in a parallel computer that includes a plurality of compute nodes may include: profiling a plurality of algorithms for each of a set of collective operations, including for each collective operation: executing the operation a plurality times with each execution varying one or more of: geometry, message size, data type, and algorithm to effect the collective operation, thereby generating performance metrics for each execution; storing the performance metrics in a performance profile; at load time of a parallel application including a plurality of parallel processes configured in a particular geometry, filtering the performance profile in dependence upon the particular geometry; during run-time of the parallel application, selecting, for at least one collective operation, an algorithm to effect the operation in dependence upon characteristics of the parallel application and the performance profile; and executing the operation using the selected algorithm.

6 Claims, 10 Drawing Sheets

ALGORITHM SELECTION FOR COLLECTIVE OPERATIONS IN A PARALLEL COMPUTER

CROSS-REFERENCE TO RELATED APPLICATION

This application is a continuation application of and claims priority from U.S. patent application Ser. No. 13/796,994, filed on Mar. 12, 2013.

BACKGROUND OF THE INVENTION

1. Field of the Invention

The field of the invention is data processing, or, more specifically, methods, apparatus, and products for algorithm selection for collective operations in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

In some parallel computers, each compute node may execute one or more tasks—a process of execution for a parallel application. Each tasks may include a number of endpoints. Each endpoint is a data communications endpoint that supports communications among many other endpoints and tasks. In this way, endpoints support collective operations in a parallel computer by supporting the underlying message passing responsibilities carried out during a collective operation. In some parallel computers, each compute node may execute a single tasks including a single endpoint. For example, a parallel computer that operates with the Message Passing Interface ('MPI') described below in more detail may execute a single rank on each compute node of the parallel computer. In such implementations, the terms task, endpoint, and rank are effectively synonymous.

Each collective operation may be effected by any one of a number of algorithms. Because different algorithms may be optimized for different characteristics of a parallel application, such as geometry, message size, and the like, selecting a particular algorithm for execution of a collective operation may be difficult.

SUMMARY OF THE INVENTION

Methods, apparatus, and products for algorithm selection for collective operations in a parallel computer are disclosed in this specification. Each compute node may be configured to execute one or more parallel processes of a parallel application. In such a system, algorithm selection for collective operations may include: profiling a plurality of algorithms for each of a set of collective operations, including for each collective operation in the set: executing the collective operation a plurality times with each execution varying one or more of: geometry, message size, data type, and algorithm to effect the collective operation, thereby generating performance metrics for each execution; storing the performance metrics in a performance profile; at load time of a parallel application including a plurality of parallel processes configured in a particular geometry, filtering the performance profile in dependence upon the particular geometry; during run-time of the parallel application, selecting, for at least one collective operation, an algorithm to effect the collective operation in dependence upon one or more characteristics of the parallel application and the filtered performance profile; and executing the collective operation using the selected algorithm.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
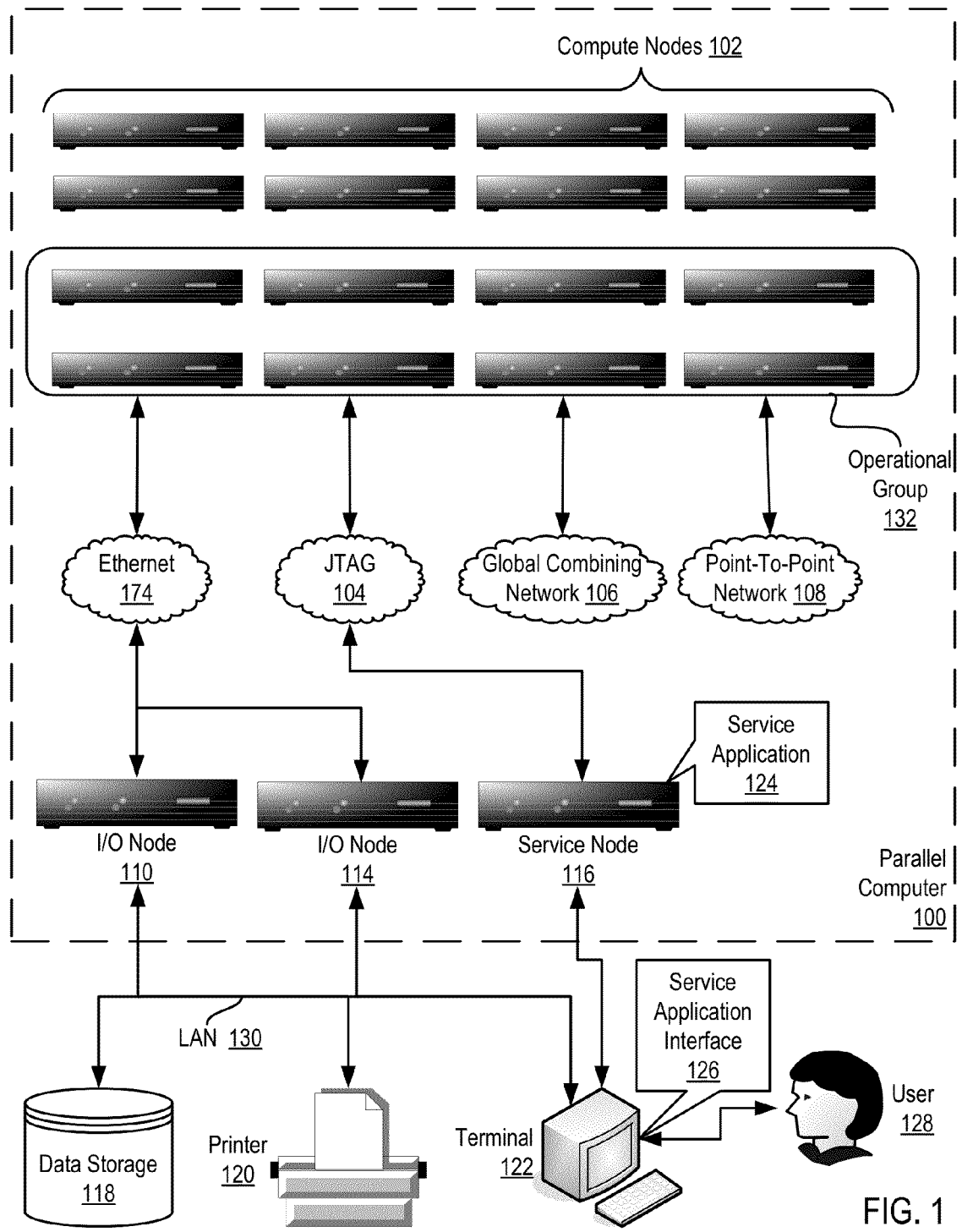
FIG. 1 illustrates an exemplary system for algorithm selection for collective operations in a parallel computer according to embodiments of the present invention.

Exemplary methods, apparatus, and products for algorithm selection for collective operations in a parallel computer in accordance with the present invention are described with reference to the accompanying drawings, beginning with FIG. 1. FIG. 1 illustrates an exemplary system for algorithm selection for collective operations in a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following predefined reduction operations:

| MPI_MAX | maximum |
|---|---|
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

The parallel computer (100) of FIG. 1 operates generally for algorithm selection for collective operations in accordance with embodiments of the present invention. To select algorithms for collective operations any one or more of the compute nodes (102) of the parallel computer (100) of FIG. 1 may profile a plurality of algorithms for each of a set of collective operations. Such profiling may include, for each collective operation in the set, executing the collective operation a plurality times with each execution varying one or more of: geometry, message size, data type, and algorithm to effect the collective operation, thereby generating performance metrics for each execution. That is, the parallel computer may profile a number of algorithms for a particular collective operation by executing the collective operation with a plurality of permutations of algorithms, characteristics of the compute nodes executing the collective operation, characteristics of the message size and data type. Each permutation may be selected in dependence upon a simulated annealing algorithm. A simulated annealing algorithm is a generic probabilistic metaheuristic for the global optimization problem of locating a good approximation to the global optimum of a given function in a large search space. A simulated annealing algorithm may be utilized when a search space is discrete and may be more efficient than exhaustive enumeration, especially when the goal is to find an acceptably good solution in a fixed amount of time rather than the best possible solution.

The term 'geometry' as it is used here refers to the size (number of compute nodes) and shape (the topology) of a group of compute nodes that execute the collective operation. The size of each permutation of the geometry may be a different power of two. The size of each permutation of the message size may likewise be a different power of two.

The term 'performance metrics' refers to any data describing performance of the collective operation execution. Examples of such performance metrics may include message passing rate, total bandwidth utilization for the execution, total time of execution, total power utilization for the execution, and other data.

As mentioned above, the profiling may be carried out for a number of collective operations and each execution of each collective operation generates performance metrics. Upon completing the profiling of the set of collective operations, the parallel computer (100) via one or more compute nodes (102) may then store the performance metrics in a performance profile. The performance profile may be broadcast to all compute nodes of the parallel computer, to a subset of compute nodes, or stored in a well known location accessible by all compute nodes.

At load time of a parallel application that includes a plurality of parallel processes configured in a particular geometry, each process in the geometry may filter the performance profile in dependence upon the particular geometry. Such filtering may remove entries in the performance profile for geometries that do not match or closely match the particular geometry of the processes of the parallel application. It is noted that the performance profile may or may not include an entry with an exact match of the particular geometry. In such cases, the parallel process may retain, during filtering, entries having a geometry 'closest' to the particular geometry based on predefined criteria, such as a geometries having a size within a predefined range, geometries having a shape with a particular number of dimensions, some combination of those two, or other criteria.

During run-time of the parallel application, each process may select, for at least one collective operation, an algorithm to effect the collective operation in dependence upon one or more characteristics of the parallel application and the filtered performance profile. The phrase 'characteristics of the parallel application' may refer to any characteristic which may affect execution of the collective operation including, for example, message size, data type, a quality-of-service (QoS) threshold for bandwidth, maximum power utilization, execution time, and the like. Once selected, each process of the parallel application may then execute the collective operation using the selected algorithm.

Algorithm selection for collective operations according to embodiments of the present invention is generally implemented on a parallel computer that includes a plurality of compute nodes organized for collective operations through at least one data communications network. In fact, such computers may include thousands of such compute nodes. Each compute node is in turn itself a kind of computer composed of one or more computer processing cores, its own computer memory, and its own input/output adapters. For further explanation, therefore, FIG. 2 sets forth a block diagram of an example compute node (102) useful in a parallel computer capable of algorithm selection for collective operations in the parallel computer according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (226), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also store din RAM (156) is a profiling application (230), a module of computer program instructions configured to carry out algorithm selection for collective operations in the parallel computer in accordance with embodiments of the present invention. The profiling application (230), when executed, may cause the compute node (102) to profile a plurality of algorithms for each of a set of collective operations (232), including for each collective operation in the set: executing the collective operation a plurality times with each execution varying one or more of: geometry, message size, data type, and algorithm to effect the collective operation, thereby generating performance metrics (236) for each execution. The profiling application (230) may then store the performance metrics (236) in a performance profile (234). Then, at load time of a parallel application (226) including a plurality of parallel processes (228) configured in a particular geometry, the parallel processes (228) (which may be instantiated on many compute nodes) may filter the performance profile (234) in dependence upon the particular geometry. During run-time of the parallel application (226), each parallel process (228) may select, for at least one collective operation, an algorithm to effect the collective operation in dependence upon one or more characteristics of the parallel application and the filtered performance profile (234) and execute the collective operation using the selected algorithm.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

Figure 2:
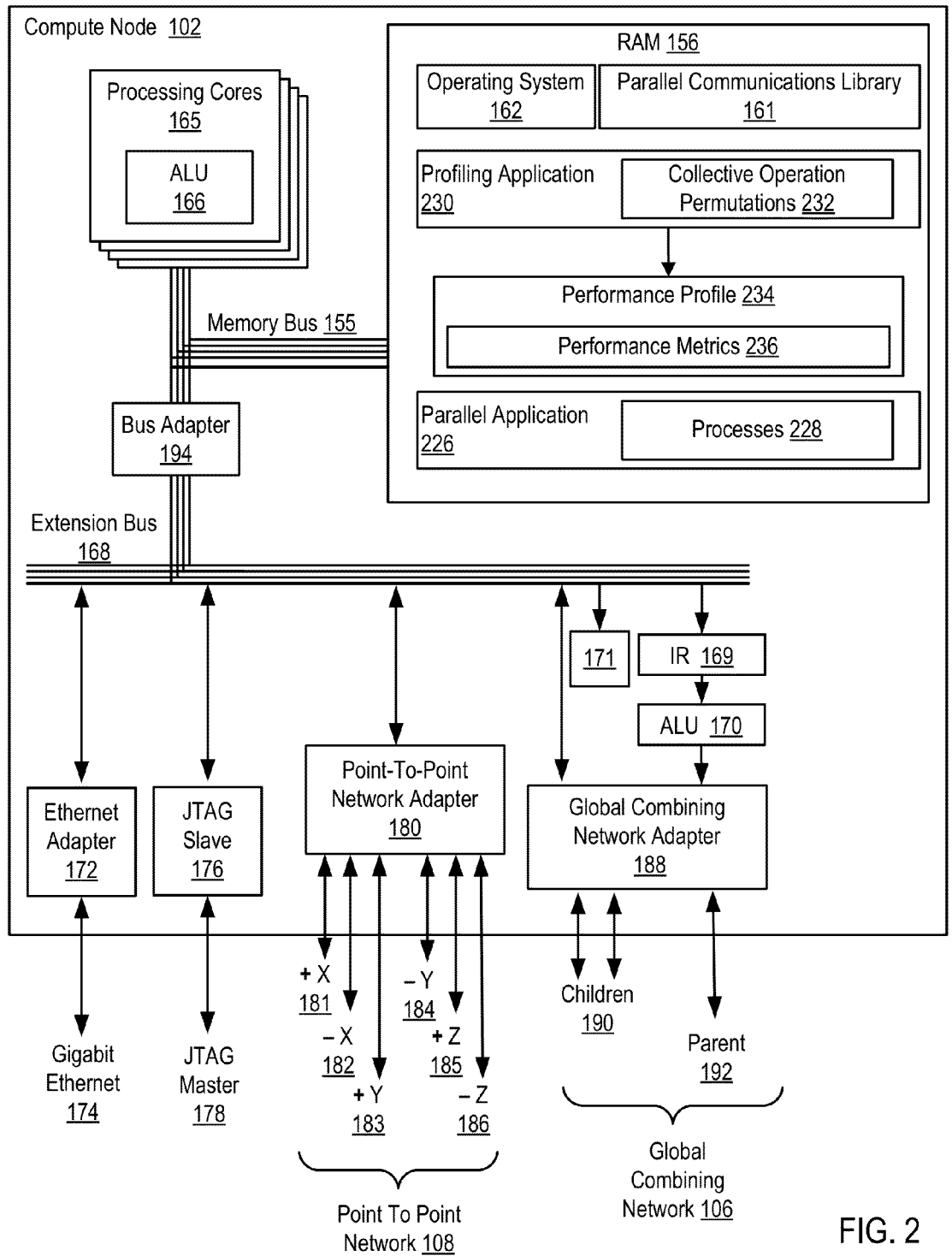
FIG. 2 sets forth a block diagram of an example compute node useful in a parallel computer capable of algorithm selection for collective operations in the parallel computer according to embodiments of the present invention.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in parallel computers capable of algorithm selection for collective operations in accordance with embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems capable of algorithm selection for collective operations in a parallel computer according to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
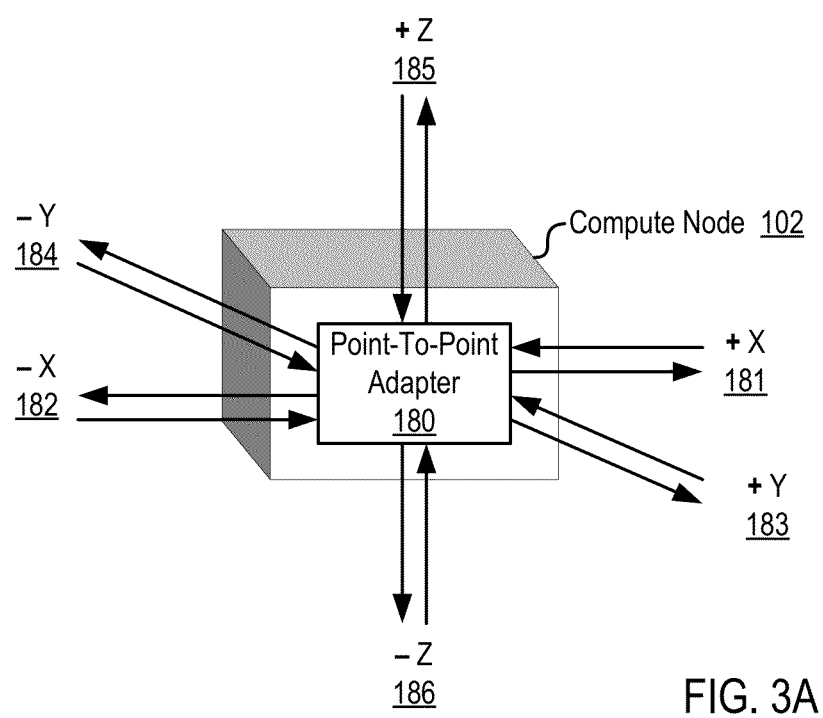
FIG. 3A sets forth a block diagram of an example Point-To-Point Adapter useful in systems for algorithm selection for collective operations in a parallel computer according to embodiments of the present invention.

For further explanation, FIG. 3A sets forth a block diagram of an example Point-To-Point Adapter (180) useful in systems capable of algorithm selection for collective operations in a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
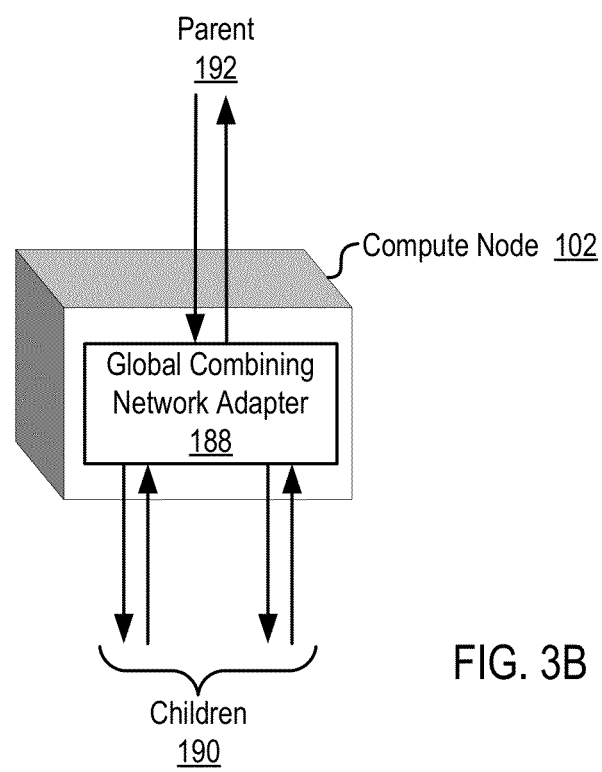
FIG. 3B sets forth a block diagram of an example Global Combining Network Adapter useful in systems for algorithm selection for collective operations in a parallel computer according to embodiments of the present invention.

For further explanation, FIG. 3B sets forth a block diagram of an example Global Combining Network Adapter (188) useful in systems capable of algorithm selection for collective operations in a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
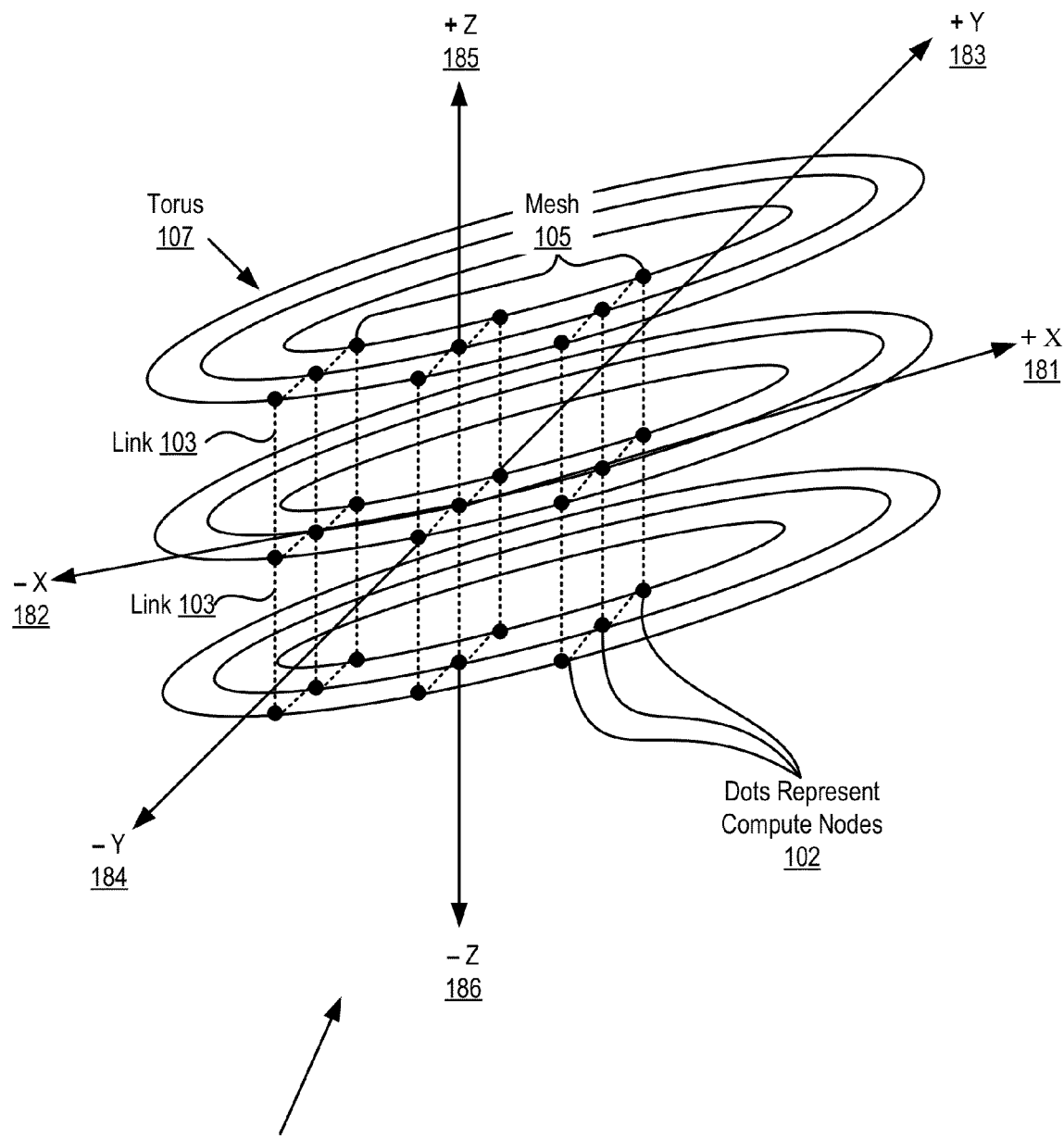
FIG. 4 sets forth a line drawing illustrating an example data communications network optimized for point-to-point operations useful in systems capable of algorithm selection for collective operations in a parallel computer according to embodiments of the present invention.

For further explanation, FIG. 4 sets forth a line drawing illustrating an example data communications network (108) optimized for point-to-point operations useful in systems capable of algorithm selection for collective operations in a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in algorithm selection for collective operations in a parallel computer in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in algorithm selection for collective operations in a parallel computer in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
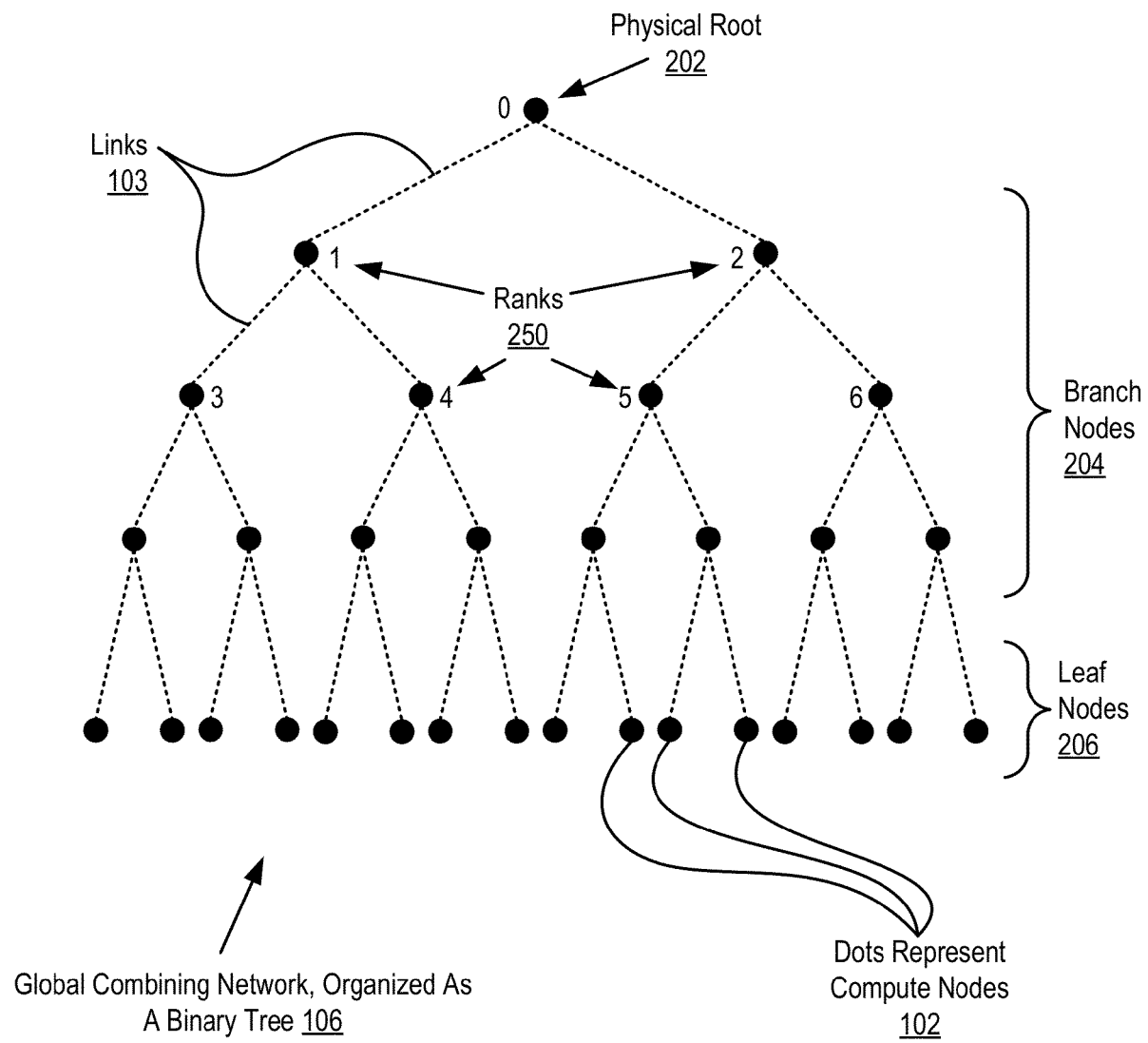
FIG. 5 sets forth a line drawing illustrating an example global combining network useful in systems capable of algorithm selection for collective operations in a parallel computer according to embodiments of the present invention.

For further explanation, FIG. 5 sets forth a line drawing illustrating an example global combining network (106) useful in systems capable of algorithm selection for collective operations in a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in algorithm selection for collective operations in a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
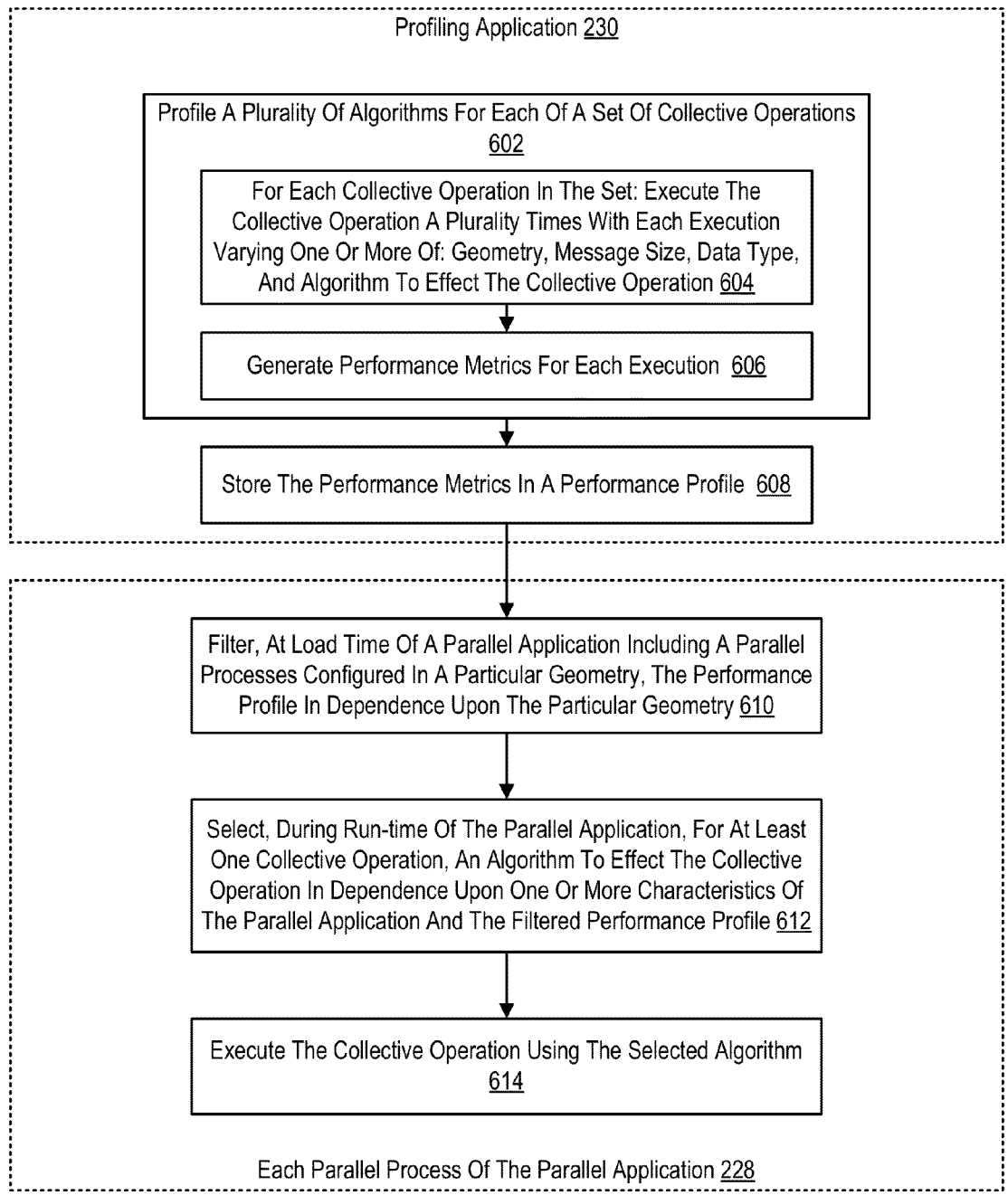
FIG. 6 sets forth a flow chart illustrating an example method for algorithm selection for collective operations in a parallel computer according to embodiments of the present invention.

For further explanation, FIG. 6 sets forth a flow chart illustrating an example method algorithm selection for collective operations in a parallel computer according to embodiments of the present invention. The method of FIG. 6 may be carried out in a parallel computer that includes a plurality of compute nodes, such as the example parallel computer of FIG. 1.

The method of FIG. 6 includes profiling (602), by a profiling application (230), a plurality of algorithms for each of a set of collective operations. In the method of FIG. 6, profiling (602) a plurality of algorithms for a set of collective operations includes, for each collective operation in the set, executing (604) the collective operation a plurality times with each execution varying one or more of: geometry, message size, data type, and algorithm to effect the collective operation. Upon each execution (604), the method of FIG. 6 includes generating (606) performance metrics for each execution.

The method of FIG. 6 also includes storing (608) the performance metrics in a performance profile. Storing (608) the performance metrics in a performance profile may be carried out in various ways including, for example, by storing an entry for each execution of a collective operation in one or more tables. In an embodiment in which the performance profile is implemented with a plurality of tables, each table may include entries of a particular geometry. Further, such tables may be associated through one or more primary or secondary keys representing a collective operation type. That is, tables associated with one particular collective operation may include an identical primary key.

At load time of a parallel application that includes a plurality of parallel processes configured in a particular geometry, the method of FIG. 6 includes filtering (610) the performance profile in dependence upon the particular geometry. Filtering (610) the performance profile may be carried out in various ways based on the implementation of the performance profile. In the example embodiment described above in which the performance profile is implemented with a plurality of tables, each table representing a different geometry and related to one another by collective operation type, filtering (610) the performance profile may include removing tables not having a matching or nearly matching geometry.

During run-time of the parallel application, the method of FIG. 6 includes selecting (612), by each parallel process (228) of the parallel application, for at least one collective operation, an algorithm to effect the collective operation in dependence upon one or more characteristics of the parallel application and the filtered performance profile. Once selected, the method of FIG. 6 includes executing (614) the collective operation using the selected algorithm.

Figure 7:
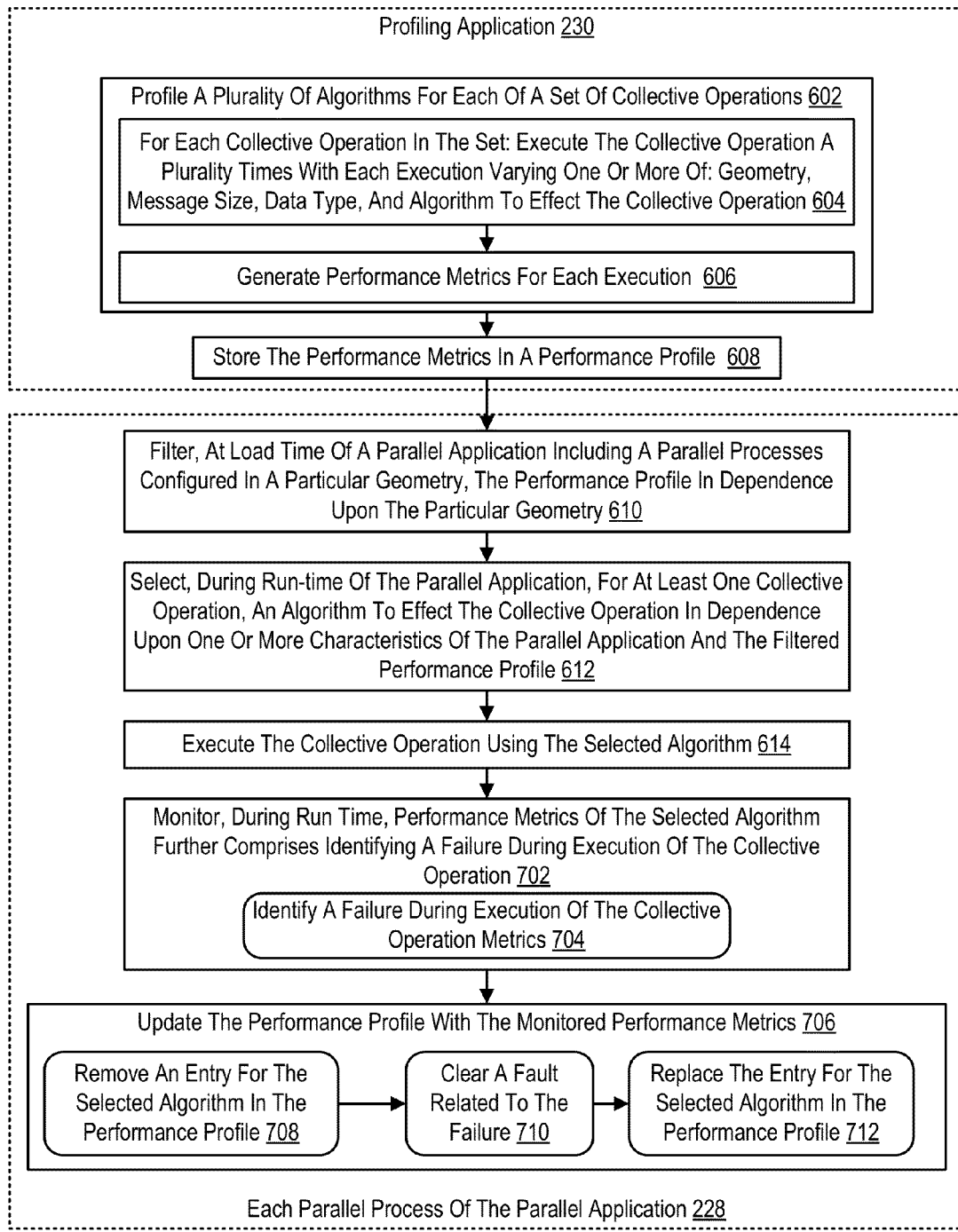
FIG. 7 sets forth a flow chart illustrating another example method for algorithm selection for collective operations in a parallel computer according to embodiments of the present invention.

For further explanation, FIG. 7 sets forth a flow chart illustrating another example method algorithm selection for collective operations in a parallel computer according to embodiments of the present invention. The method of FIG. 7 is similar to the method of FIG. 6 in that the method of FIG. 7 may also be carried out in a parallel computer such as the example parallel computer of FIG. 1. The method of FIG. 7 is also similar to the method of FIG. 6 in that the method of FIG. 7 also includes profiling (602) a plurality of algorithms for each of a set of collective operations, storing (608) performance metrics in a performance profile, filtering (610) the performance profile in dependence upon the particular geometry, selecting (612) an algorithm to effect at least one collective operation, and executing the collective operation using the selected algorithm.

The method of FIG. 7 differs from the method of FIG. 6, however, in that the method of FIG. 7 also includes monitoring (702), during run time, performance metrics of the selected algorithm. Such monitoring (702) may be carried out in various ways including tracking bandwidth utilization, CPU utilization, time of execution, and so on.

The method of FIG. 7 also includes updating (706) the performance profile with the monitored performance metrics. In some embodiments, updating (706) the performance profile with the monitored performance metrics may include modifying entries in the performance profile to reflect the monitored performance metrics.

In the example of FIG. 7, monitoring (702) the performance metrics may include identifying (704) a failure during execution of the collective operation. Identifying (704) a failure during execution of the collective operation may include identifying a hardware failure or identifying a software failure. To that end, updating (706) the performance profile may also include removing an entry for the selected algorithm in the performance profile.

Such a failure may, in some cases, be the result of the selected algorithm. In other cases, such as in the case of a hardware failure, the failure may not be the result of the selected algorithm. To that end, the method of FIG. 7 may also include clearing (710) a fault related to the failure and replacing (712) the entry for the selected algorithm in the performance profile.

Figure 8:
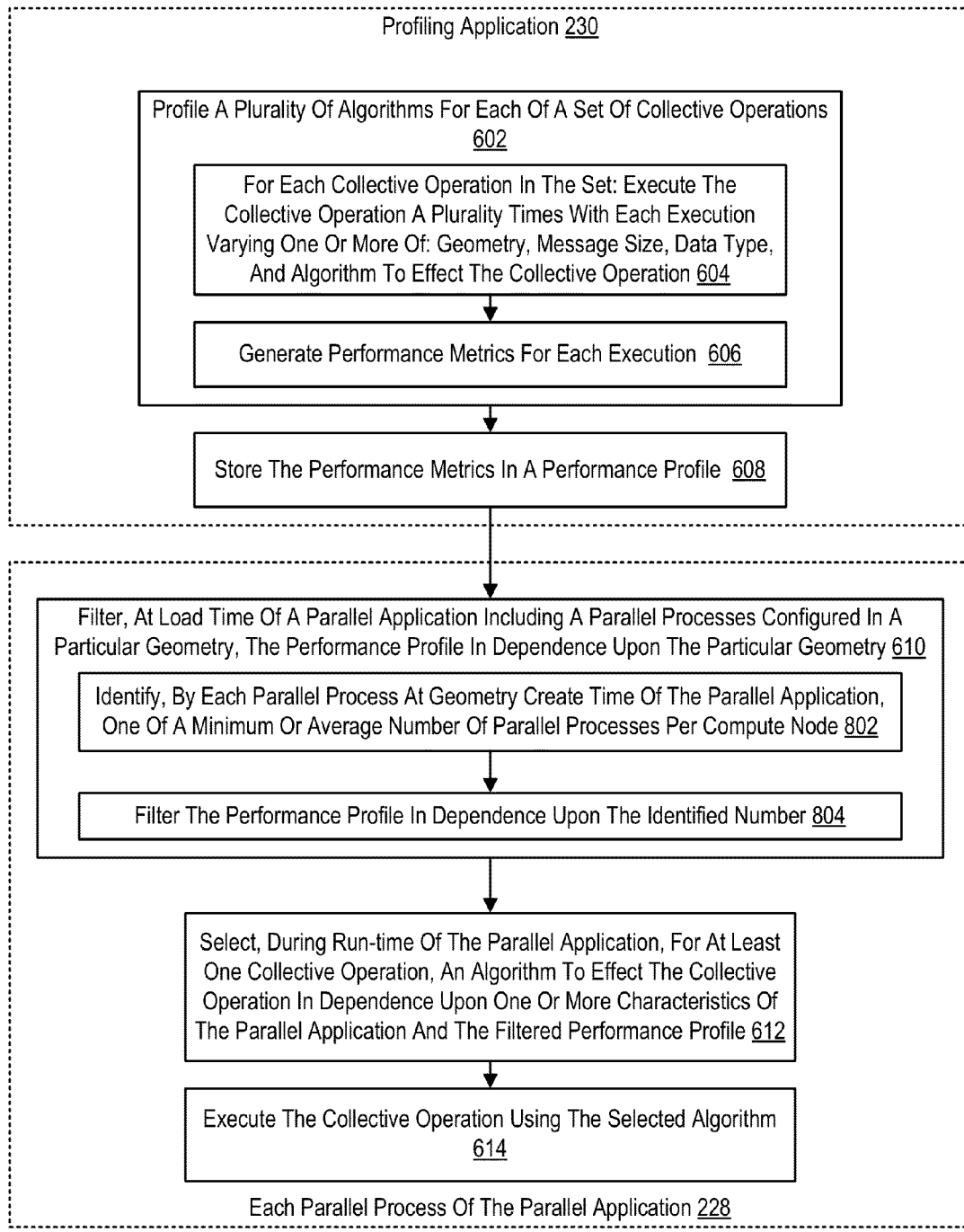
FIG. 8 sets forth a flow chart illustrating another example method for algorithm selection for collective operations in a parallel computer according to embodiments of the present invention.

For further explanation, FIG. 8 sets forth a flow chart illustrating another example method algorithm selection for collective operations in a parallel computer according to embodiments of the present invention. The method of FIG. 8 is similar to the method of FIG. 6 in that the method of FIG. 8 may also be carried out in a parallel computer such as the example parallel computer of FIG. 1. The method of FIG. 8 is also similar to the method of FIG. 6 in that the method of FIG. 8 also includes profiling (602) a plurality of algorithms for each of a set of collective operations, storing (608) performance metrics in a performance profile, filtering (610) the performance profile in dependence upon the particular geometry, selecting (612) an algorithm to effect at least one collective operation, and executing the collective operation using the selected algorithm.

The method of FIG. 8 differs from the method of FIG. 6, however, in that in the method of FIG. 8 filtering (610) the performance profile includes identifying (802), by each parallel process at geometry create time of the parallel application, one of a minimum or average number of parallel processes per compute node. In some embodiments, each compute node may execute a number of parallel processes of the parallel application that is different than the number of parallel processes executing on another node. Also, the geometries captured in profiling algorithms for the set of collective operations may also include specifications of 'processes per node.' Because each process of the parallel application may only be aware of the number of processes on the same node upon which the process is executing (and because different nodes may execute a different number of processes per node), filtering the performance profile based on geometry may provide different results for processes on different nodes. To that end, the method of FIG. 8 sets forth a means by which each process identifies, possibly through an ALLREDUCE operation, a same number of processes per node to utilize when filtering the performance profile. Such a number may be an average number of processes per node among all compute nodes or a minimum number of processes per node. Once identified (802), the method of FIG. 8 continues by filtering (804) the performance profile in dependence upon the identified number.

Figure 9:
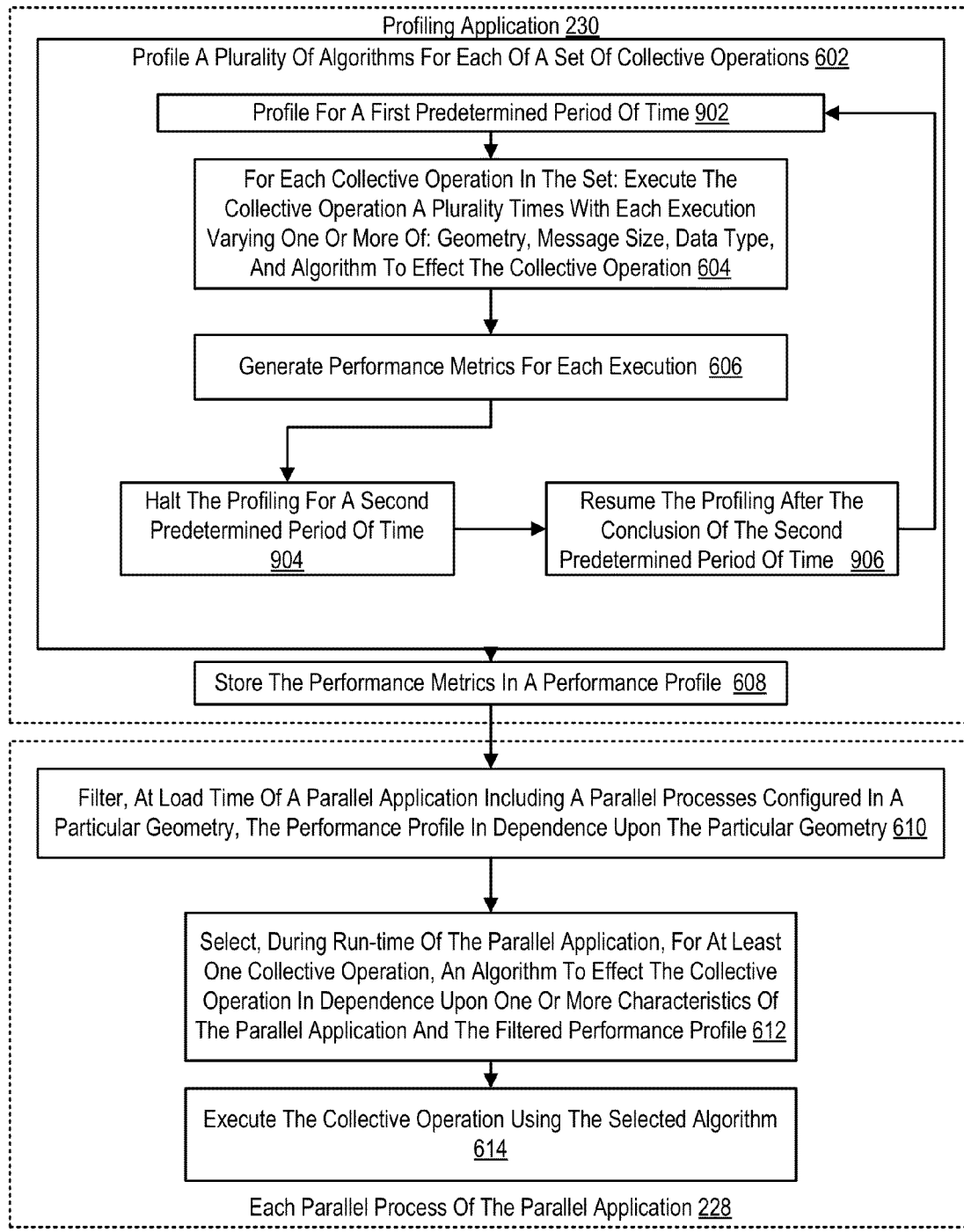
FIG. 9 sets forth a flow chart illustrating another example method for algorithm selection for collective operations in a parallel computer according to embodiments of the present invention.

For further explanation, FIG. 9 sets forth a flow chart illustrating another example method algorithm selection for collective operations in a parallel computer according to embodiments of the present invention. The method of FIG. 9 is similar to the method of FIG. 6 in that the method of FIG.

9 may also be carried out in a parallel computer such as the example parallel computer of FIG. 1. The method of FIG. 9 is also similar to the method of FIG. 6 in that the method of FIG. 9 also includes profiling (602) a plurality of algorithms for each of a set of collective operations, storing (608) performance metrics in a performance profile, filtering (610) the performance profile in dependence upon the particular geometry, selecting (612) an algorithm to effect at least one collective operation, and executing the collective operation using the selected algorithm.

The method of FIG. 9 differs from the method of FIG. 6, however, in that in the method of FIG. 9 profiling (602) a plurality of algorithms for each of a set of collective operations may include profiling (902) for a first predetermined period of time, halting (904) the profiling for a second predetermined period of time, and resuming (906) the profiling after the conclusion of the second predetermined period of time. In this way, profiling may be 'checkpointed'—that is, halted and resumed at a later time—such that power consumption may be managed or actual production activities are not impacted by the profiling.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of algorithm selection for collective operations in a parallel computer comprising a plurality of compute nodes, each compute node configured to execute one or more parallel processes of a parallel application, the method comprising:

profiling a plurality of algorithms for each of a set of collective operations, including for each collective operation in the set: executing the collective operation a plurality times with each execution varying one or more of: geometry, message size, data type, and algorithm to effect the collective operation, thereby generating performance metrics for each execution;

storing the performance metrics in a performance profile, wherein the performance profile comprises a plurality of entries;

at load time of a parallel application including a plurality of parallel processes configured in a particular geometry, filtering the entries of the performance profile in dependence upon the particular geometry;

during run-time of the parallel application, selecting, for at least one collective operation, an entry for an algorithm from the filtered entries of the performance profile to effect the collective operation in dependence upon one or more characteristics of the parallel application and the filtered performance profile;

executing the collective operation using the selected algorithm;

monitoring, during run time, performance metrics of the selected algorithm, wherein monitoring performance metrics of the selected algorithm comprises identifying a failure during execution of the collective operation; and updating the performance profile with the monitored performance metrics, wherein updating the performance profile with the monitored performance metrics comprises removing the selected entry for the algorithm in the performance profile.

2. The method of claim 1, further comprising:

clearing a fault related to the failure; and replacing the entry for the selected algorithm in the performance profile.

3. The method of claim 1, wherein profiling the plurality of algorithms for each of the set of collective operations further comprises:

profiling for a first predetermined period of time, halting the profiling for a second predetermined period of time, and resuming the profiling after the conclusion of the second predetermined period of time.

4. The method of claim 1, wherein each varied execution is selected in dependence upon a simulated annealing algorithm.

5. The method of claim 1, wherein filtering the performance profile in dependence upon the particular geometry further comprises:

identifying, by each parallel process at geometry create time of the parallel application, one of a minimum or average number of parallel processes per compute node; and filtering the performance profile in dependence upon the identified number.

6. The method of claim 1, wherein selecting, for at least one collective operation, the entry for the algorithm from the filtered entries of the performance profile to effect the collective operation in dependence upon characteristics of the parallel application and the filtered performance profile further comprises:

identifying entries of the filtered performance profile for the collective operation;

identifying, from the entries for the collective operation, entries including a same number of compute nodes as the geometry of the parallel application;

identifying, from entries for the collective operation having the same number of compute nodes, entries having a same number of parallel processes per compute node as the geometry of the parallel application;

identifying, from those entries for the collective operation having the same number of compute nodes and the same number of parallel processes, an entry having a highest performance metric; and selecting the algorithm related to the entry having the highest performance metric as the algorithm to effect the collective operation.

* * * * *